Sept. 25, 1934.    F. H. DANIELS ET AL    1,974,768
GAS SCRUBBER
Filed May 2, 1932    3 Sheets-Sheet 1

INVENTORS
FRED H. DANIELS
KEVORK K. NAHIGYAN
BY
Albert G. Blodgett
ATTORNEY

Sept. 25, 1934.  F. H. DANIELS ET AL  1,974,768
GAS SCRUBBER
Filed May 2, 1932  3 Sheets-Sheet 2

INVENTORS
FRED H. DANIELS
KEVORK K. NAHIGYAN
BY
Albert G. Blodgett
ATTORNEY

Sept. 25, 1934.    F. H. DANIELS ET AL    1,974,768
GAS SCRUBBER
Filed May 2, 1932    3 Sheets-Sheet 3
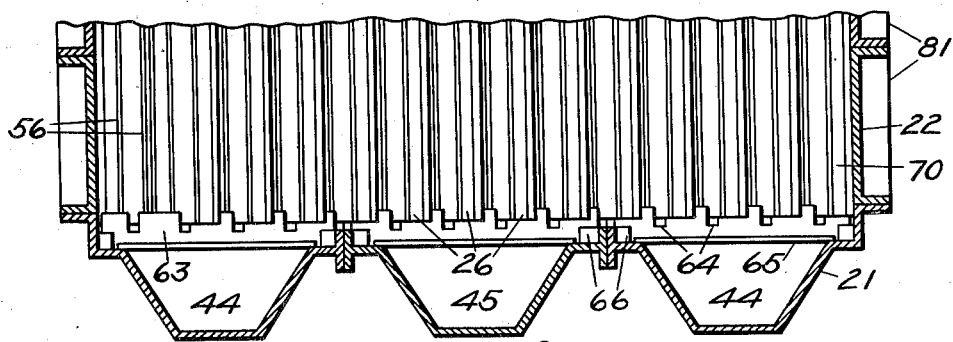
Fig. 3
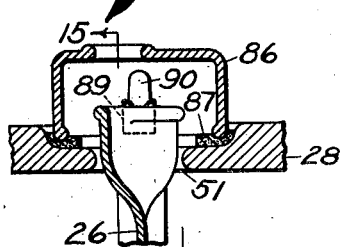
Fig. 6
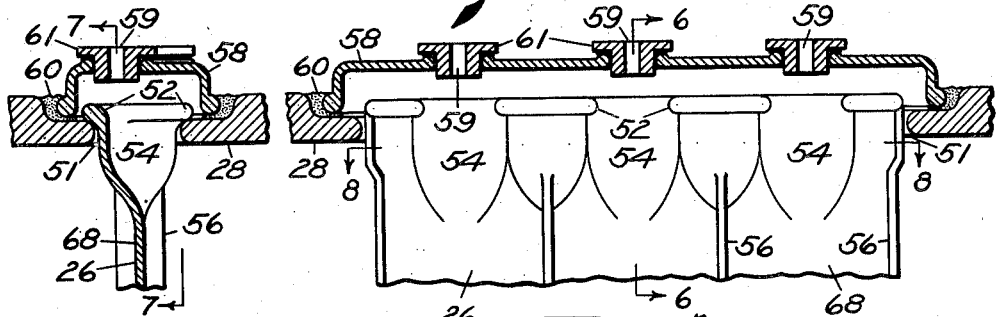
Fig. 7
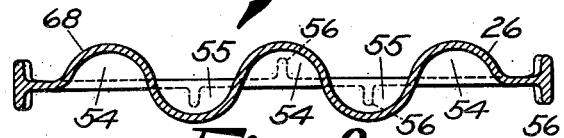
Fig. 8
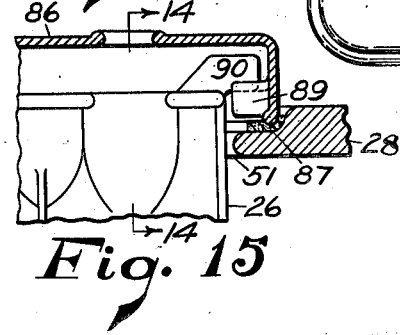
Fig. 14
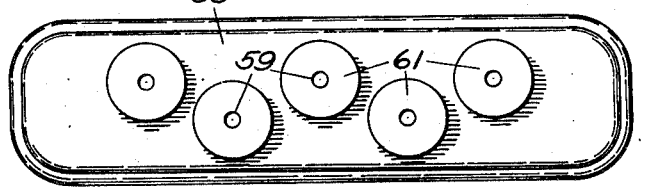
Fig. 9
Fig. 15
INVENTORS
FRED H. DANIELS
KEVORK K. NAHIGYAN
BY
Albert G. Blodgett
ATTORNEY Patented Sept. 25, 1934

1,974,768

UNITED STATES PATENT OFFICE 1,974,768

GAS SCRUBBER

Fred H. Daniels and Kevork K. Nahigyan, Worcester, Mass., assignors to Riley Stoker Corporation, Worcester, Mass., a corporation of Massachusetts Application May 2, 1932, Serial No. 608,716

18 Claims. (Cl. 183—21)

This invention relates to gas scrubbers, and more particularly to an apparatus which will serve to remove particles of dust or other fine material from a flowing stream of gas.

In the operation of combustion furnaces fired by means of pulverized coal, it is usually found that a considerable amount of fine ash is carried out of the furnace in suspension in the gaseous products of combustion. The discharge of such material from the furnace stack is highly undesirable, particularly in case the furnace is located in a thickly settled district. Various constructions have been proposed heretofore to overcome this difficulty, but so far as we are aware none of these prior arrangements have proven satisfactory. Some are very expensive to manufacture or to operate. Others are heavy and bulky, or produce an excessive draft loss in the gas stream passing therethrough. Still others are subject to rapid corrosion from the gases, and the construction is such that corroded parts can be renewed only with great difficulty and at considerable expense.

It is accordingly one object of the invention to provide a gas scrubber which will serve to remove most of the dust from the gases flowing therethrough, and which is inexpensive to manufacture and operate.

It is a further object of the invention to provide a gas scrubber which is comparatively light and compact, and which will produce the desired cleaning effect on the gases with a minimum draft loss and with a minimum consumption of water.

It is a further object of the invention to provide a gas scrubber which will be as free from corrosion as possible, and which is so arranged that all parts subject to corrosion can be quickly and easily replaced.

It is a further object of the invention to provide a gas scrubber which is so constructed and arranged that a minimum of machine work need be employed in the manufacture of the various parts.

It is a further object of the invention to provide a gas scrubber which is so constructed and arranged that the various parts may expand and contract freely with changes in temperature without affecting the operation.

It is a further object of the invention to provide a gas scrubber construction so arranged that by using a few standardized parts a considerable range of scrubber capacities or shapes may be produced to fit the conditions of particular installations.

It is a further object of the invention to provide a deflector plate for a gas scrubber which is simple and inexpensive to manufacture, and which will withstand for a long time the action of corrosive gases and water.

It is a further object of the invention to provide a deflector plate for a gas scrubber which will maintain a thin downwardly flowing film of liquid for contact with the dust laden gases, and which will prevent the liquid from being swept away by the gas stream.

It is a further object of the invention to provide a simple and effective clamp for fastening together the sections of a gas scrubber deflector plate without materially affecting the liquid film flowing thereover.

It is a further object of the invention to provide a simple guide bar which will serve to hold in place the lower ends of the deflector plates of a gas scrubber and which will allow the plates to be readily removed if desired.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a vertical longitudinal section through a gas scrubber and the ducts connected thereto;

Fig. 3 is a section on the line 3—3 of Fig. 1;

Fig. 6 is an enlarged detail in section showing one means for supporting the deflector plates and distributing water thereto, the section being taken on the line 6—6 of Fig. 7;

Fig. 7 is a section on the line 7—7 of Fig. 6;

Fig. 8 is a section on the line 8—8 of Fig. 7;

Fig. 9 is a top plan view of the water distributor shown in Fig. 7;

Fig. 10 is a detail of the adjacent portions of two deflector plate sections;

Fig. 11 is a view similar to Fig. 10 with the clamping means in place;

Fig. 12 is a detail of a deflector plate clamp;

Fig. 13 is a perspective view of the clamp shown in Fig. 12;

Fig. 14 is a sectional view similar to Fig. 6 showing a modification, the section being taken on the line 14—14 of Fig. 15; and Fig. 15 is a section on the line 15—15 of Fig. 14.

Figure 2:
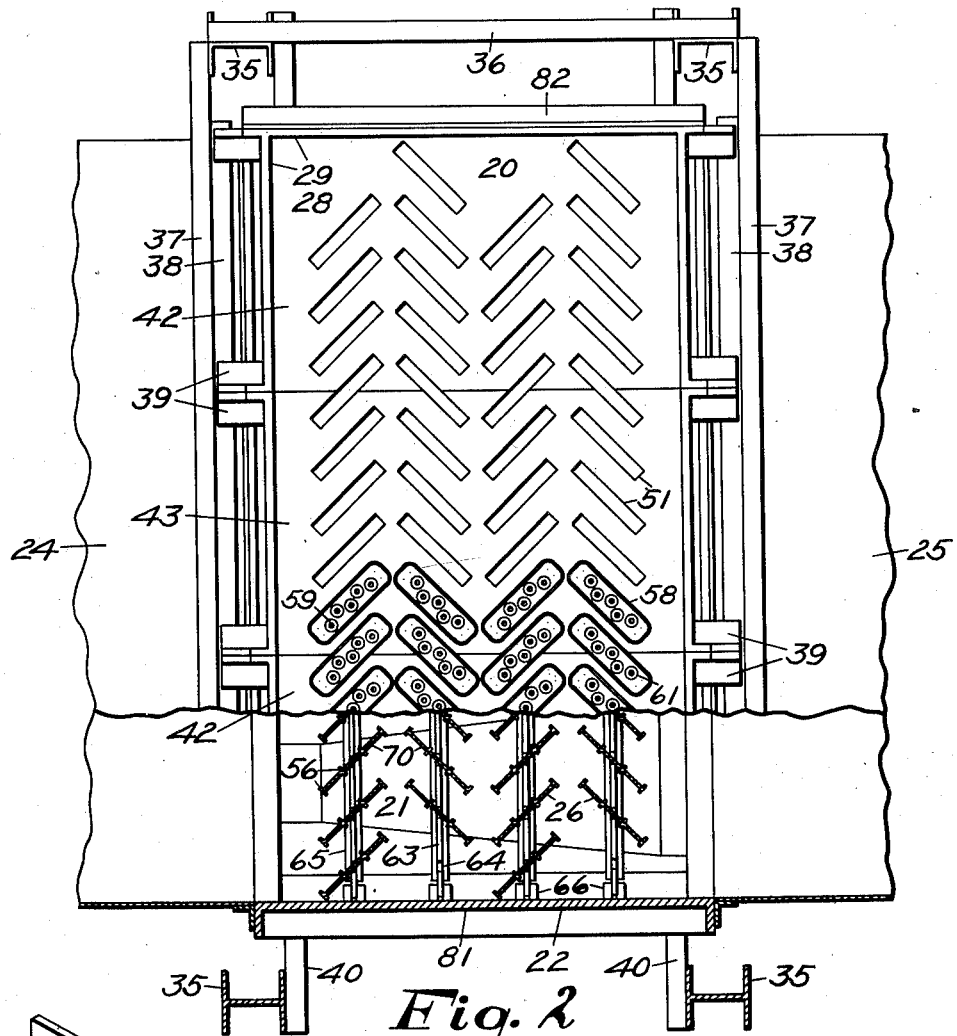
Fig. 2 is a top plan view of the gas scrubber, certain of the deflector plates having been removed, and the lower portion of the figure being shown in section on the line 2—2 of Fig. 1.
Figure 4:
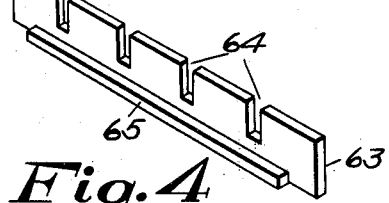
Fig. 4 is a perspective view of one of the guide bars for the deflector plates.

The embodiment illustrated in the drawings comprises an upper supply tank 20, a lower collecting tank 21 located therebeneath, and two spaced side walls 22 extending vertically between the tanks. These parts define a horizontal gas passage to which an inlet duct 24 and an outlet duct 25 are connected. A plurality of deflector plates 26 extend vertically downward from the upper tank 20 across the path of the gases, and streams of water or other suitable liquid flow from the upper tank and over the surfaces of the plates to wash dust from the gases downwardly into the lower tank 21. The deflector plates 26 are arranged in transverse rows, and the plates in each row are inclined at about forty-five degrees to the general direction of the gas flow, the plates in successive rows being oppositely inclined to form tortuous or zig-zag gas passages. We have found that in cleaning flue gases, four rows of plates will produce the desired result without excessive draft loss. As shown in Fig. 2, two of the deflector plates are omitted at each side of the scrubber, to avoid the formation of dead pockets.

Figure 1:
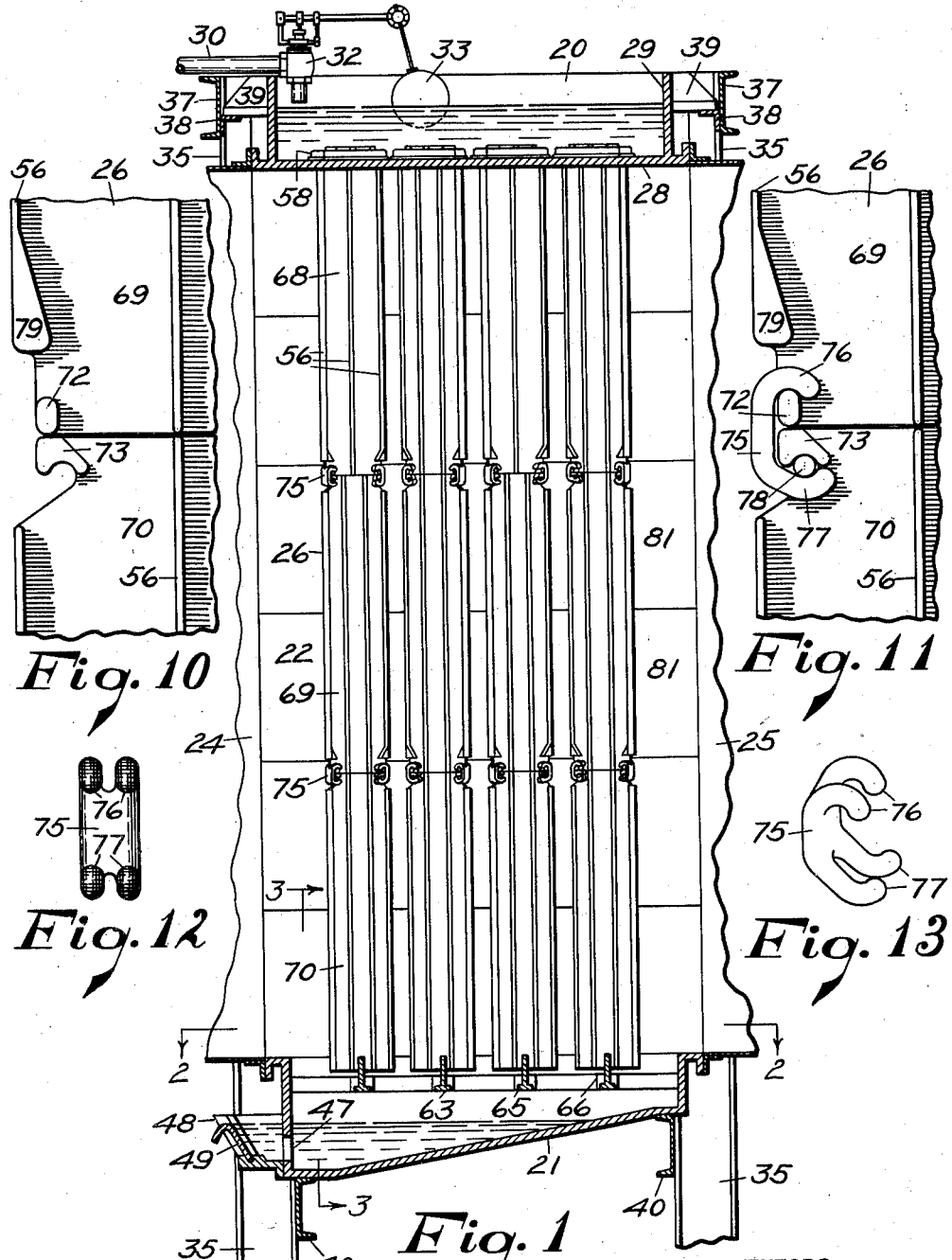

The upper supply tank 20 comprises a flat horizontal bottom plate 28 and upstanding side plates 29, the top of the tank being entirely open. As shown in Fig. 1, water may be supplied to the tank through a pipe 30 provided with a valve 32 which is controlled by a float 33 located in the tank. With this arrangement, a predetermined depth of water may be maintained in the tank at all times.

The tanks 20 and 21 are preferably supported by means of an external framework, which may be of structural steel. For this purpose we have shown four vertical columns 35 located in rectangular formation, two on each side of the scrubber. These columns may be formed from standard rolled steel H-sections. The tops of the columns at each side of the scrubber are connected by means of horizontal tie members 36 (Fig. 2) which may be formed from steel channels extending longitudinally, a portion of the flanges of the H-columns being cut away to facilitate the connection of the channels thereto. A pair of horizontal beams extend transversely between the tops of each pair of laterally opposite H-columns, each beam comprising a channel 37 having an angle 38 mounted thereon to form a shelf projecting horizontally toward the tank 20. The tank 20 is formed with a number of lugs 39 which rest upon the shelves 38. The lower tank 21 is supported upon a pair of horizontal beams 40 which are shown as channels extending transversely between each pair of laterally opposite H-columns. The channels 40 are attached to the inner faces of the columns, and the channels 37 to the outer faces of the columns, whereby a compact construction is provided without interfering with the connection of the ducts 24 and 25 to the scrubber. The tanks are preferably not bolted to the supporting framework, but merely rest thereon. As a result the entire gas scrubber is free to slide relative to the frame as the ducts 24 and 25 expand or contract with temperature changes.

A gas scrubber of this type must be produced in various widths to correspond with various gas capacities and space requirements. This necessitates the manufacture of several sizes of upper and lower tanks, and since these parts are preferably formed of cast iron, the pattern expense for the various sizes would be considerable. Furthermore, the manufacture, shipment, and installation of integral cast iron tanks, particularly in the larger sizes, would present something of a problem. We have overcome these difficulties by means of the construction disclosed, in which the tanks are formed of sections with the joints between the sections extending longitudinally. Each tank thus comprises a pair of end sections, and if necessary one or more intermediate sections to provide the desired width. Since the intermediate sections will all be alike, only three patterns are necessary for each tank, and yet the scrubber can be made in the largest widths demanded by commercial requirements. The embodiment illustrated is three sections wide, the upper tank 20 comprising a pair of end sections 42 and an intermediate section 43 (Fig. 2), and the lower tank 21 comprising a pair of end sections 44 and an intermediate section 45 (Fig. 3). The intermediate section 43 of the upper tank and the corresponding section 45 of the lower tank are of the same width. The adjacent sections of the tanks are provided with mating flanges whereby they may be bolted tightly together.

Each section of the lower tank 21 is provided with walls which slope toward an outlet opening 47 (Fig. 1), through which water and the dust collected from the gases is discharged. A discharge spout 48 is mounted outside each of the openings 47 to form a water seal, and a plate 49 is slidably mounted in each spout to form the outer wall thereof. By removing this plate 49, access to the interior of the tank may be facilitated.

It is desirable that the deflector plates 26 should be free to expand with changes in temperature, and also that they should be easily removable in case replacement is necessary. For this purpose, the plates 26 are suspended from the upper tank 20, and allowed to hang freely from their upper ends, and the bottom wall 28 of the tank 20 is provided with a series of rectangular slots or openings 51 through which the plates may be inserted or removed.

Referring now to Figs. 6 to 9 inclusive, it will be seen that each deflector plate may be enlarged at its upper edge or otherwise so shaped that it will not drop through the slot 51, but will remain properly suspended. For this purpose the upper edge of the plate may have outwardly projecting beads or flanges 52 which overlap the edges of the slot.

The plates 26 are flat throughout the major part of their extent, but their extreme upper portions are corrugated, as shown particularly in Fig. 8, to provide three pockets or recesses 54 on one side which alternate with two similar pockets 55 on the opposite side. These pockets merge smoothly and gradually into the flat portion of the plate beneath. The plates are inserted at assembly with the pockets 54 facing toward the inflowing gas. The pockets on one or both sides of each plate are supplied with water, which quickly spreads out as a result of the shape of the plate into a thin film covering the entire plate surface. Parallel vertical ribs 56 may be formed on the plates to prevent the water film and the dust collected thereby from being swept off from the plates. These ribs are preferably located at each side of the pockets, and as shown in Fig. 8, there may be four ribs on one side of the plate and three ribs on the other side.

In order to deliver water at a predetermined rate to each deflector plate, we provide a cover plate 58 above each of the slots 51, and form orifices 59 in these plates to direct jets of water into the pockets in the deflector plates. The cover plates are preferably of inverted U-shape in cross section, and their lower edges are tightly sealed to the bottom wall 28 of the tank 20 by means of a suitable water proof cement or paste 60. The upper surface of the wall 28 may be recessed around the slots 51, as shown in Figs. 6 and 7, to aid in holding the cement 60 in place. The orifices 59 are preferably formed in separate flanged sleeves or nozzles 61, which are cemented or otherwise secured in openings in the upper walls of the cover plates 58. It will be clear that nozzles 61 having orifices 59 of various sizes may be provided, dependent upon the quantity of water to be supplied, and that blank nozzles may be utilized in connection with the pockets 55 in case it is desired to operate with the rear surfaces of the deflector plates dry.

In order to prevent any excessive swaying of the deflector plates, we preferably provide means for holding the lower ends of the plates fixed in the proper relative positions. For this purpose we utilize a series of guide bars 63 each shaped as a vertical plate having spaced deep rectangular notches 64 in its upper edge and laterally projecting strengthening flanges 65 at its lower edge. These bars 63 are mounted transversely on the lower tank sections 44 and 45, with the ends of the bars located between lugs 66 on the tank sections. The lower ends of the deflector plates 26 fit obliquely in the notches 64, or in certain cases between the adjacent ends of the aligned bars 63.

Not only must a gas scrubber of this type be produced in different widths, but it must also be produced in different heights so that it may be conveniently adapted to the conditions which may be encountered in various installations. We accomplish this result without a multiplicity of patterns by forming the deflector plates 26 in a plurality of sections, each section being suspended from the lower end of the section next above. The illustrated embodiment is three sections high, each deflector plate having an upper section 68, an intermediate section 69, and a lower section 70. Higher scrubbers may be produced by adding more of the intermediate sections. This sectionalized construction for the deflector plates makes it possible to insert them or remove them from the scrubber even though the roof or some other part of the building structure is located a short distance above the upper tank 20. It is merely necessary to have sufficient clearance for one of the deflector plate sections. The intermediate and lower sections 69 and 70 are preferably made with four ribs on each side, so that they may be reversed in case one face becomes eroded after long use.

The preferred means for fastening together the sections of the deflector plates is illustrated particularly in Figs. 10 to 13 inclusive. Each plate section 68 and 69 is formed with a lug or boss 72 near each of its lower corners, and each plate section 69 and 70 is formed with a lug or boss 73 near each of its upper corners. At assembly, the lugs 73 are positioned directly beneath the lugs 72. It will be understood that these lugs 72 and 73 are formed on both faces of the plates. A clamp 75 is provided to cooperate with the lugs in fastening the plates together. This clamp is formed with a pair of upper hooks 76 and a pair of lower hooks 77, the two pairs of hooks being opposed to each other, whereby the clamp is C-shaped in side elevation. The hooks of each pair are slightly spaced from each other. At assembly, the upper hooks 76 straddle the upper plate section and engage the lugs 72, while the lower hooks 77 straddle the lower plate section and underlie the lugs 73. These lugs 73 are formed with concave lower surfaces, and a pin 78 (Fig. 11), which may be slightly tapered, is driven horizontally between these concave surfaces and the lower hooks 77, thus firmly connecting the adjacent plate sections. The rib 56 at the edge of each upper section is formed with a sloping portion 79 at its lower end to direct the water film inwardly above the clamp 75. It is found that the water flows partly around and partly over the clamp, and the water film covers the entire width of the lower plate section below the clamp.

Figure 5:
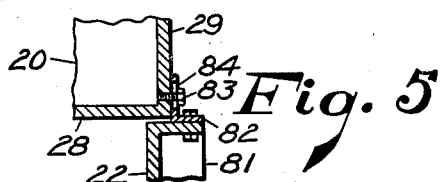
Fig. 5 is a detail in section showing the joint between the gas scrubber side wall and the upper tank.

The side walls 22 of the gas scrubber are preferably formed of a plurality of flat flanged plates 81 mounted one above another. The lowermost plates rest upon the outer portions of the lower tank sections 44. Since these plates will expand or contract with changes in temperature, we provide suitable expansion joints between the top plates and the upper tank 20. The preferred construction, as shown in Fig. 5, comprises an angle 82 arranged with one leg vertical and in contact with the outside of the upper tank, and the other leg horizontal and in contact with the upper plate 81. The angle is slidably held against the tank by means of studs or screws 83 located in vertical slots 84 in the angles. The plates 81 each have a vertical dimension which is divisible into the length of the deflector plate sections 69. In the present case, the height of each plate 81 is one-half the length of the sections 69, so that for each increase of one section in the height of the gas scrubber, two plates 81 will be added at each side. No multiplicity of pattern sizes is required.

In Figs. 14 and 15 we have disclosed a modification which comprises a cover plate 86 similar to the plate 58 but somewhat enlarged in a vertical direction. The plate 86 rests upon the bottom plate 28 of the tank 20 above the slot 51. A gasket 87 of a suitable yieldable material, such as asbestos, is placed beneath the edge of the cover plate. In order to compress the gaskets 87 and prevent leakage of water, we suspend the deflector plates 26 from the cover plates 86, the weight of these parts being sufficient for the purpose. As illustrated, the cover plate 86 is formed at each end with an inwardly projecting lug 89 having a concave upper surface shaped to receive a lug 90 projecting outwardly from the upper portion of the deflecting plate. The deflecting plate may thus swing relative to the cover plate 86 without tipping the latter or relieving the pressure on any portion of the gasket 87.

When our apparatus is utilized for cleaning the waste gases from combustion furnaces, which are liable to be corrosive, particularly as a result of the sulphur oxides contained therein, we preferably construct the deflector plates 26 and the clamps 75 with a core of a suitable metal, such as cast iron, and a coating of acid resisting enamel baked thereon. We have found after thorough experimentation that such enameled parts have a long life of usefulness, and that the smooth glazed surface aids in the maintenance of the thin water film and prevents the sticking and resultant accumulation of dust particles. All corners and edges of these parts are well rounded to aid in the application of the enamel coating and prevent localized overheating thereof during the baking process. The tanks 20 and 21, and the side wall plates 81 may be protected by means of a suitable high-temperature and acid-resisting paint.

The operation of the invention will now be apparent from the above disclosure. Water is supplied to the upper tank 20 through the pipe 30, and the water level in the tank is maintained substantially constant by means of the float 33 and the valve 32. The water flows through the orifices 59 into the pockets 54 and 55, which spread the water out into thin downwardly flowing films covering the surfaces of the deflector plates 26. Gas enters the scrubber from the inlet duct 24, follows tortuous paths among the deflector plates, and leaves through the outlet duct 25. Dust particles in the gas are thrown violently against the deflector plates and adhere to the water film, which carries them downward into the tank 21 and out through the discharge spout 48 to a suitable drain. The ribs 56 prevent the dust and water from being swept off from the deflector plates by the gas.

As a result of the sectionalized construction of the tanks, deflector plates, and side walls, the manufacture and installation of the scrubber is greatly facilitated, and various heights and widths may be assembled from a few standard parts. The deflector plates and side walls may expand or contract freely with changes in temperature without in any way affecting the operation. The deflector plates may be easily installed or removed through the slots 51, and any slight swaying of the plates during operation will not affect the tightness of the joints between the cover plates 53 or 86 and the bottom wall 28 of the tank 20. Since the upper tank is supported by the steel framework independently of the side walls, the plates 81 may be readily removed for replacement without disturbing the other parts of the apparatus.

Having thus described our invention, what we claim as new and desire to secure by Letters Patent is:

1. A gas scrubber comprising walls forming a gas passage, a group of deflector plates suspended from their upper ends and extending substantially vertically across the gas passage, each plate being formed of a plurality of sections each of which is suspended from the lower end of the section next above, and means to maintain a downwardly flowing film of liquid on said plates.

2. A gas scrubber comprising walls forming a gas passage, a group of deflector plates extending across the gas passage, means to maintain a film of liquid on the surfaces of said plates, a collecting tank beneath the plates, said tank having an outlet opening therein, and a discharge spout on the outside of the tank in communication with the outlet opening to form a liquid seal, one wall of the spout being removable to facilitate access to the interior of the tank.

3. A gas scrubber comprising a tank provided with a flat horizontal bottom wall having openings therein, deflector plates beneath the openings and suspended from their upper ends, and cover plates mounted over the openings and forming a leak proof joint with the bottom wall, said cover plates having orifices therein to distribute liquid from the tank to the deflector plates.

4. A gas scrubber comprising a tank provided with a flat horizontal bottom wall having openings therein, substantially vertical deflector plates arranged with their upper ends in the openings, and a cover plate of inverted U-shape in cross-section mounted over each opening, the lower edges of the cover plates forming a leak proof joint with the bottom wall, and the upper walls of the cover plates having orifices to distribute liquid from the tank to the deflector plates.

5. A gas scrubber comprising a tank provided with a flat horizontal bottom wall having slots therein, deflector plates beneath the slots, said plates having lugs at their upper edges which engage the upper surface of the bottom wall to support the weight of the plates, and cover plates mounted over the slots and entirely out of contact with the deflector plates, said cover plates forming a leakproof joint with the bottom wall and having orifices therein to distribute liquid from the tank to the deflector plates.

6. A gas scrubber comprising a tank provided with a flat horizontal bottom wall having slots therein, cover plates mounted over the slots, resilient gaskets between the cover plates and the bottom wall, and deflector plates suspended from the cover plates and extending below said openings, the cover plates having orifices therein to distribute liquid from the tank to the deflector plates, and the weight of the deflector plates aiding in compressing the gaskets.

7. A gas scrubber comprising an upper tank, a lower tank therebeneath, two spaced side walls extending vertically between the tanks, a group of deflector plates located between the side walls, means to distribute liquid from the upper tank over the surfaces of the plates, a frame to support the upper tank independently of the side walls, and means providing expansion joints for each side wall to allow expansion of the side walls independently of the supporting frame.

8. A gas scrubber comprising an upper tank, a lower tank therebeneath, two spaced side walls extending vertically between the tanks, a group of deflector plates located between the side walls, means to distribute liquid from the upper tank over the surfaces of the plates, a frame to support the upper tank independently of the side walls, and means providing expansion joints between the upper edges of the side walls and the upper tank.

9. A gas scrubber comprising an upper tank constructed of two side sections and one or more intermediate sections arranged to contain a single body of liquid which communicates freely throughout all the sections, two spaced side walls extending downwardly from the side sections, a group of deflector plates located between the side walls, means to distribute liquid from the tank over the surfaces of the plates, and a lower tank beneath the plates and extending between the side walls, the lower tank being constructed of two side sections and one or more intermediate sections, the intermediate section of the lower tank being of the same width as the intermediate section of the upper tank.

10. A gas scrubber comprising an upper tank, a lower tank therebeneath, two spaced side walls extending vertically between the tanks, a group of vertical deflector plates located between the side walls, and means to distribute liquid from the upper tank over the surfaces of the plates, each deflector plate being formed of upper and lower sections and one or more intermediate sections, and the side walls being formed of a plurality of plates mounted one above another and each having a vertical dimension which is divisible into the length of the intermediate deflector plate sections.

11. A deflector plate for a gas scrubber comprising a flat vertical plate, and means providing a shallow lateral pocket located near the upper edge of the plate and shaped to merge smoothly and gradually in a downward direction into the flat surface of the plate beneath, the pocket being adapted to receive a liquid stream and spread it out into a thin film covering the surface of the plate.

12. A deflector plate for a gas scrubber comprising a flat vertical plate, and a series of vertical ribs on the plate, the upper portion of the plate being corrugated to provide a series of pockets each of which is shaped to receive a liquid stream and spread it out into a thin film over the surface of the plate.

13. A deflector plate for a gas scrubber comprising a flat vertical plate, and a series of vertical ribs on the plate, the upper portion of the plate being corrugated to provide a series of pockets which lead alternately to opposite sides of the plate, and the pockets being shaped to merge smoothly and gradually into the flat portion of the plate beneath.

14. A deflector plate for a gas scrubber comprising a flat vertical plate, a series of vertical ribs on the plate, and projecting lugs at the lower corners of the plate to permit the connection of a lower plate section therebeneath.

15. A deflector plate for a gas scrubber comprising a flat vertical plate, a series of vertical ribs on the plate, and projecting lugs at the upper corners of the plate, said lugs having concave lower surfaces and being shaped to permit the plate to be connected to an upper plate section thereabove.

16. A clamping device for the sections of a gas scrubber deflector plate comprising a body portion, and two opposed pairs of hooks thereon, the hooks of each pair being slightly spaced from each other.

17. A gas scrubber comprising two vertical deflector plate sections, one directly beneath the other, lugs at the lower corners of the upper section, lugs at the upper corners of the lower section, a clamp having opposed pairs of upper and lower hooks straddling the upper and lower plate sections respectively, one pair of hooks engaging the lugs on one plate section, and a horizontal pin located beneath the other pair of hooks and the lugs on the other plate section, whereby the two plate sections are fastened together.

18. A gas scrubber comprising an upper tank, a lower tank therebeneath, two spaced side walls extending vertically between the tanks, a group of deflector plates suspended at their upper ends from the upper tank and extending substantially vertically between the side walls, means to distribute liquid from the upper tank over the surfaces of the plates, and a series of guide bars mounted on the lower tank and having spaced notches in their upper edges which receive the lower ends of the deflector plates, and prevent them from swaying.

FRED H. DANIELS.
KEVORK K. NAHIGYAN.